Aug. 20, 1929.   B. R. WILLIAMSON   1,725,040
APPARATUS FOR MOLDING ARTICLES FROM PULP
Filed Aug. 16, 1926   2 Sheets-Sheet 1
Fig.1.
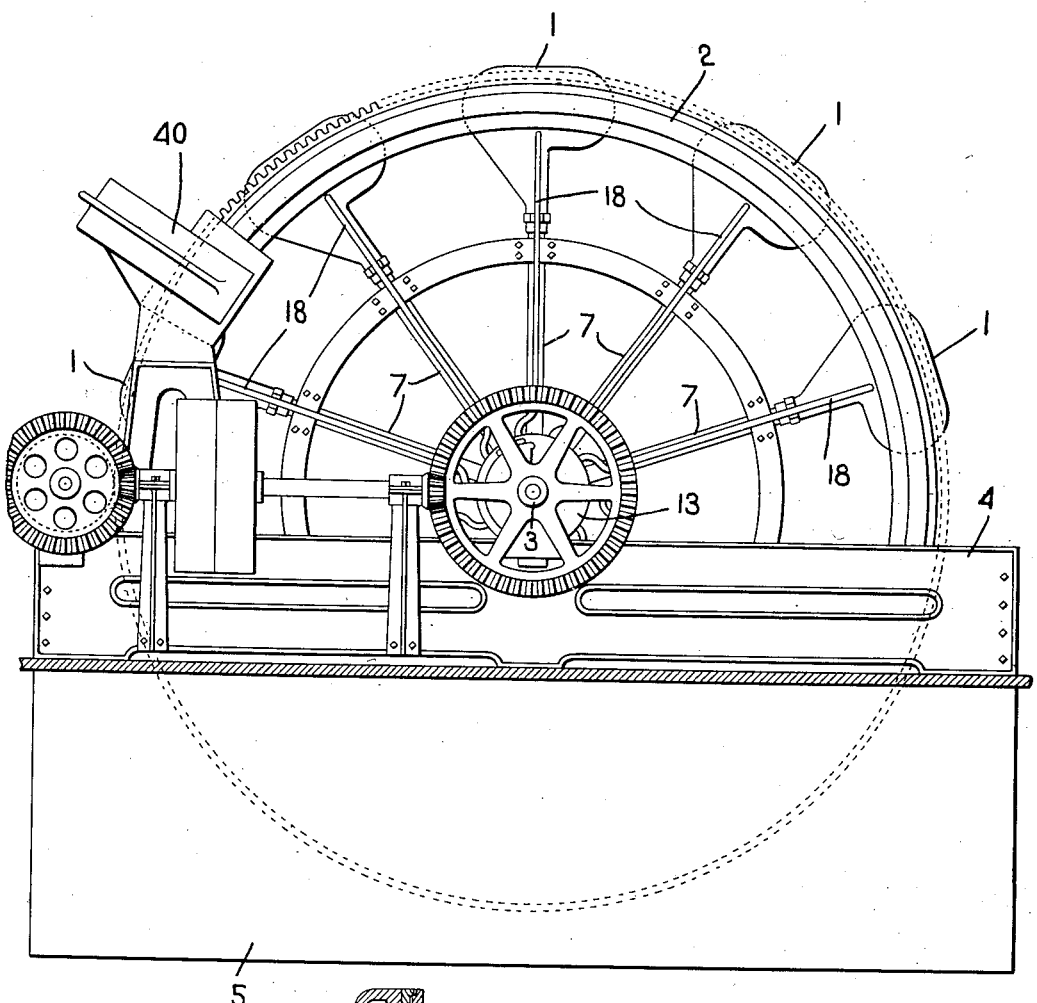
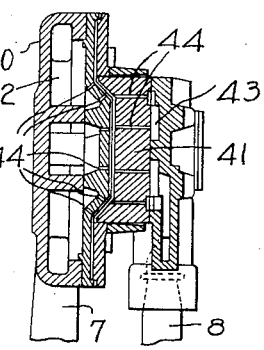
Fig.11
Inventor.
Bert R. Williamson
by Heard Smith & Tennant
Attys.

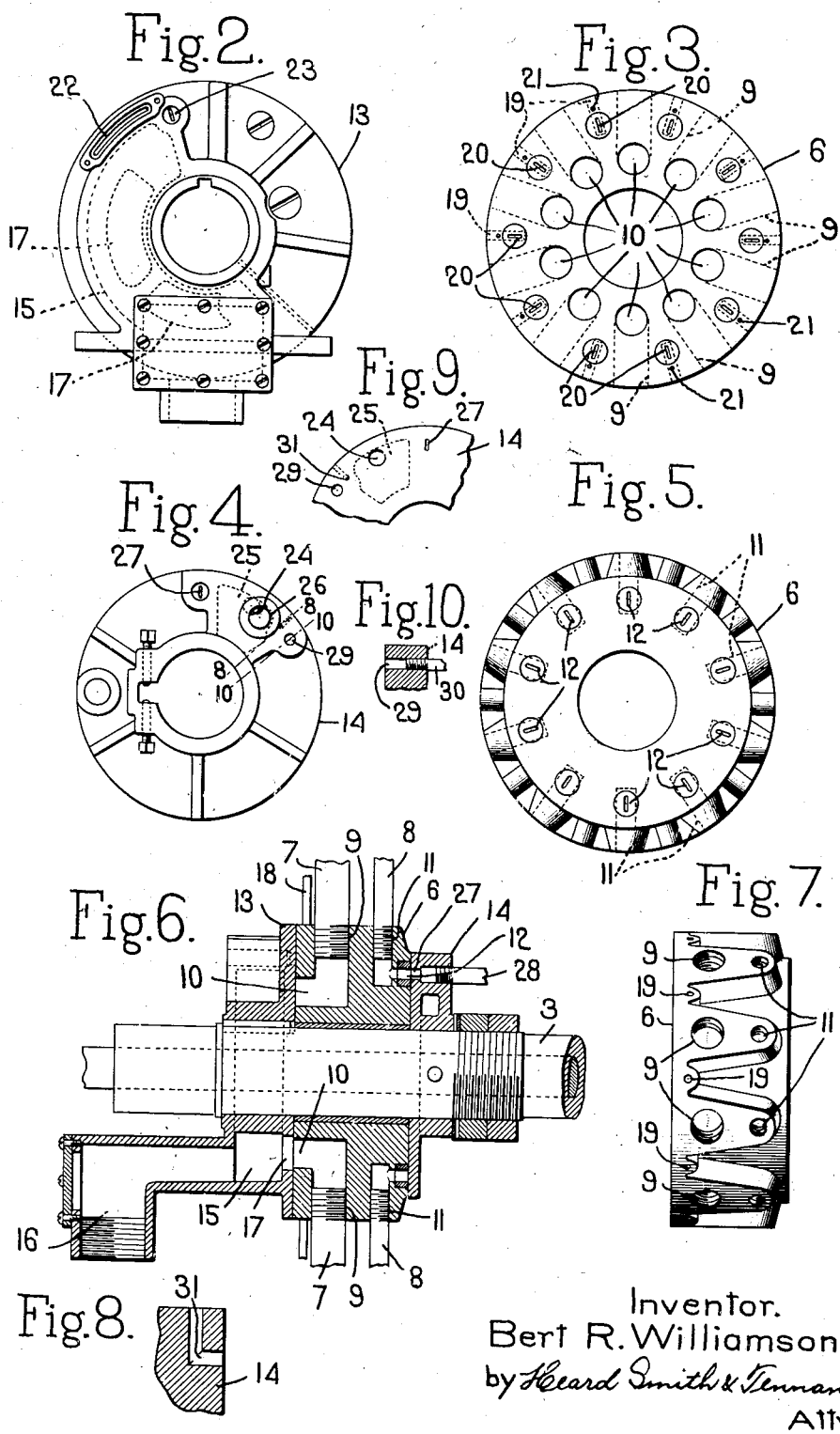

Patented Aug. 20, 1929.

1,725,040

UNITED STATES PATENT OFFICE.

BERT R. WILLIAMSON, OF FAIRFIELD, MAINE, ASSIGNOR, BY MESNE ASSIGNMENTS, TO FIDELITY TRUST COMPANY, TRUSTEE, OF PORTLAND, MAINE, A CORPORATION OF MAINE.

APPARATUS FOR MOLDING ARTICLES FROM PULP.

Application filed August 16, 1926. Serial No. 129,371.

This invention relates to an apparatus for molding articles from pulp and particularly to an apparatus of the type shown in United States Patents No. 759,616, May 10th, 1904, No. 1,184,420, dated May 23rd, 1916 and reissue Patent No. 12,911, dated January 12th, 1909.

The machines illustrated in said patents are provided with one or more molds each having complemental mold faces between which the article is formed and each also being provided with chambers and openings or ports through the mold faces communicating with the chambers, means being provided to apply either suction or compressed air to the mold faces through said chambers and openings. In the operation of the machine one member of each mold, which for convenience will be referred to as the receiving member, is dipped into a vat containing pulp and at the same time suction is applied to said mold member thereby to cause a layer of pulp to be deposited on the face thereof. After the mold member has been elevated from the vat with the layer of pulp on its face the two mold members are closed together and subjected to compression thereby to compress the pulp layer between the complemental mold faces into an article of the desired shape, the suction remaining on the receiving mold member during the compressing operation. After the mold members have thus been subjected to pressure said members are separated from each other and just prior to separation a puff of compressed air is admitted to the receiving mold member and suction is applied to the other mold member (which for convenience will be called the compressing mold member) by which operation the pulp article is loosened from the face of the receiving mold member and is transferred to the compressing mold member. Subsequently the compressing mold member with the pulp article attached thereto is brought into correlation with a pick off or suction head of a transferring device at which time compressed air is admitted to the compressing mold member so that the combined action of the air pressure in the compressing mold member and the suction of the suction device will transfer the molded article from said compressing mold member to the pick-off which in turn will carry it to a conveyer or dryer.

In the operation of machines of this type it is desirable to remove or extract as much as possible of the water from the pulp during the compressing operation because immediately after the compressing operation the article is transferred from the receiving mold member to the compressing mold member and then subsequently is transferred to the pick-off and still later transferred from the pick-off to a conveyer, and the dryer the article is the more easily it can be handled during these various transfers and the less danger there will be that the article will be damaged or disturbed during its transfer from one part of the apparatus to another.

It is one of the objects of my present invention to improve the apparatus illustrated in the above-mentioned patents by providing means which enables a greater amount of water to be removed from the pulp during the compressing operation than is possible with the structures shown in said patents. In accordance with my present invention I provide means whereby compressed air may be admitted to one of the chambers of the mold during the compressing operation and while suction is applied to another chamber so that the suction will be opposed by compressed air operating through the compressed pulp. In the construction herein shown means are provided for admitting compressed air to the chamber of the compressing mold member during the compressing operation and while the suction is still applied to the receiving mold member. Thus with the present invention there will be pressure in one mold member and suction in the other mold member at the time that the pulp layer is subjected to pressure for forming the pulp article, with the result that an increased amount of water will be removed from the pulp during the compressing operation.

The nature of the invention will more fully appear from the accompanying description and drawings and will be particularly pointed out in the claims.

The drawings illustrate as much of the apparatus of the type disclosed in the aforementioned patents as is necessary for an understanding of the invention here involved and show in detail the particular improvements which are the subject of the subjoined claims.

In the drawings:

Fig. 1 is a side elevation of an apparatus for molding articles from pulp, said apparatus being shown in a somewhat conventional form for the purpose of illustrating the general arrangement of the parts;

Fig. 2 is a front elevation of the collar on the shaft looking toward the machine as positioned in Fig. 1;

Fig. 3 is a view showing the end of the hub of the mold carrier, which engages the collar shown in Fig. 2, and which is toward the observer in Fig. 1;

Fig. 4 is a side elevation of the outer face of the collar on the shaft at the rear side of the hub;

Fig. 5 is a view of the opposite side of the hub from that shown in Fig. 3;

Fig. 6 is a sectional view of the hub of the mold carrier and the collars;

Fig. 7 is a side view of the hub;

Fig. 8 is an enlarged section on the line 8—8, Fig. 4;

Fig. 9 is a view of the face of the rear collar with which the hub contacts.

Fig. 10 is a section on the line 10—10, Fig. 4.

Fig. 11 is a sectional view through one of the molds showing the two mold members in resting relation.

Since the apparatus herein shown is similar in its general features and construction as well as in its operation to the devices illustrated in the above-mentioned patents it will not be necessary to describe it in great detail.

In the apparatus herein shown the molds, indicated generally at 1, are carried by a revolving mold carrier 2 which is mounted for rotation on a stationary shaft 3 that is supported on a frame 4. Beneath the frame is a vat 5 containing the pulp from which the article is made.

Each mold 1 comprises two mold members 50 and 41, all as described in the above-mentioned patents, one of which members is referred to as the receiving mold member, in that it dips into the pulp and receives thereon a layer of pulp and the other of which is referred to for convenience as a compressing mold member because it is closed against the receiving mold member thereby to press the pulp layer into an article of the desired shape. The mold member 40 is herein illustrated as the receiving mold member and the mold member 41 as the compressing mold member. These mold members are provided with the usual chambers 42, 43 and with openings 44 extending through the face of the mold and communicating with the chambers.

The mold carrier is provided with a hub 6 which is mounted to rotate freely on the stationary shaft 3 and the mold members are connected to the hub through the medium of radial hollow arms 7, 8, the arms 7 leading to the chambers 42 of the receiving mold members and the arms 8 leading to the chambers 43 of the compressing mold members. These arms 7 and 8 form part of the means through which suction or air pressure is applied to the mold members.

The hollow arms 7 are shown as screwed into openings 9 formed in the hub 6, said openings leading to and communicating with ports 10 that open through one side face of the hub. The arms 8 are similarly screwed into openings 11 formed in the hub each communicating with a port 12 formed in the other side face of the hub.

The hub is located between two stationary collars 13 and 14 which are fast on the stationary shaft 3. The collar 13 is provided with a vacuum chamber 15 which is connected to a suction apparatus through a suitable connection 16 and this chamber 15 has ports or openings 17 with which each port 10 registers during the time that the corresponding mold member is immersed in the pulp and also until after the mold has passed the compression device 40 and which may have any suitable construction, such for instance as that illustrated in Patent No. 908,577, January 5th, 1909.

Each receiving mold member is shown as having a pipe 18 connected to the rear face thereof which extends parallel to the arm 7 and communicates with a recess 19 formed in the hub, which recess 19 has communication with two other ports 20 and 21. During the rotation of the mold carrier the port 21, which is a port of small size, is brought into registry with a port 22 formed in the collar 13, which port 22 communicates with the atmosphere so that during the registry of the ports 21 and 22 a small amount of air will be admitted to the receiving mold member. This occurs while the suction is still on said member and until just after the compressing operation, the admission of the air serving to facilitate the removal of the water which is squeezed out of the pulp, all as described in Patent No. 1,184,420.

In machines such as set forth in said patent after the mold members have been pressed together to form the pulp article said members are separated and just before the separation occurs a puff of compressed air is delivered to the receiving mold member for the purpose of loosening the molded article from the face thereof and suction is applied to the compressing mold member with the result that as the members separate the molded article is transferred from the receiving mold member to the compressing mold member and is carried by the latter into position for delivery to the pick-off device.

For delivering the puff of compressed air to the receiving mold member the collar 13 is provided with a port 23 which communicates with a source of compressed air supply and which is situated so that the ports 20 will register therewith as the hub turns. These ports are so relatively placed that each port 20 comes into registry with the port 23 just after the corresponding mold has passed the compression device 40 and as the mold members begin to separate.

Suction is applied to each compression mold member at the time that it begins to separate from its corresponding receiving mold member by reason of the fact that at this time the corresponding port 12 comes into registry with a port 24 in the collar 14 which leads to a vacuum chamber 25 in said collar, said vacuum chamber being connected to a suitable vacuum apparatus through a pipe or other connection which communicates with the chamber through an inlet 26.

When during the rotation of the mold carrier each compression member has been carried into proper position to deliver the molded article to the suction device of the pick off, compressed air is delivered to said mold member so as to assist in the transfer of the molded article from the face of the compressing member to the suction device. To provide for this the collar 14 is formed with a port 27 which is situated to register with the ports 12, said port 27 being connected by a pipe 28 with a source of compressed air supply. When, therefore, each port 12 comes into communication with the port 27 compressed air will be admitted to the compressing mold member and this occurs just as said member is in proper correlation with the pick-off for the transfer of the molded article from the compressing mold member to the pick-off.

The parts thus far described are or may be all as illustrated in the above-mentioned patents.

The present invention relates to an improvement on the devices thus far described by which an added or increased amount of water may be removed from the pulp during the compressing operation. It will be remembered that while the members of each mold are passing through the compressing device suction is applied to the receiving mold member, the corresponding port 10 at such time registering with the suction port 17. In the present invention means are provided whereby at this time compressed air is admitted to the compressing mold member so that during the compressing operation one mold member will have suction applied thereto, the other mold member having air pressure therein. There is thus an increased pressure difference established between the opposite sides of the molded article and this results in forcing from the molded article an increased amount of water which is drawn off through the suction port.

To provide for this the collar 14 is formed with a port 29 communicating with a source of compressed air supply through a pipe 30, this port being so situated that the port 12 of any compressing mold member will be brought into registry therewith just at the time that the molds are passing through the compressing device. When any port 12 thus does come into registry with a port 29 compressed air will be delivered to the compressing mold member thus producing the conditions above referred to.

It will be remembered that after each mold has passed through the compressing device the mold members are separated and the molded article is transferred from the face of the receiving mold member to that of the compressing mold member as said members begin to separate, this being accomplished by reason of the fact that at this time the port 12 of the compressing mold member comes into registry with the port 24 of the vacuum chamber 25 so that suction is applied to the compressing mold member, and the port 10 of the receiving mold member comes into registry with the compressed air port 23 so that a puff of compressed air is delivered to the receiving mold member.

In the device herein shown means are provided for relieving the air pressure in the compressing mold member after the port 12 has passed out of registry with the port 29 and before the said port comes into registry with the port 25 of the vacuum chamber. This is done by providing the collar 14 with a vent port 31 which is situated between the ports 29 and 24 so that after each port 12 in the hub 6 is carried out of registry with the port 29 it comes into registry with the vent port 31 thus venting the compressing mold member before suction is applied to the mold for transferring the molded article from the receiving to the compressing mold member.

Another advantage which is gained with the above construction is that the introduction of the compressed air into the compressing mold member through the port 29 and during the compressing operation has a tendency to loosen the molded article from the face of the compressing member so that when the mold members are subsequently separated and the molded article has been transferred to the face of the compressing mold member said article will simply rest lightly against the face and be held by suction rather than by the intimate contact which was produced during the compressing operation. This thus facilitates the transfer of the molded article from the compressing member to the suction device of the transferring mechanism.

I claim:

1. In a machine for molding articles from pulp, a travelling mold comprising two mold members movable toward and from each other during their travelling movement, means operative in one position of said mold to deposit a layer of pulp on the face of one member, means operative in another position of said mold to compress said layer of pulp between the members as the mold travels thereby to form an article of the desired shape, and means operative automatically to exhaust the air from one mold member during the compressing operation and to simultaneously supply compressed air to the other mold member.

2. In an apparatus for molding articles from pulp, a travelling mold comprising a receiving member and a compressing member movable toward and from each other as the mold travels, means operative in one position of said travelling mold to deposit a layer of pulp on the face of the receiving member, means operative in another position of the travelling mold to compress said layer of pulp between said members as the mold travels thereby to form an article of the desired shape, means operative automatically to apply suction to the receiving member and to supply compressed air to the compressing member during the compressing operation, means operative during the continued travel of the mold to supply compressed air to the receiving member and to apply suction to the compressing member, and means to separate the mold members, the formed article being transferred from the receiving member to the compressing member by the combined action of the compressed air and suction.

3. In an apparatus for molding articles from pulp, a travelling mold comprising a receiving member and a compressing member, means operative in one position of said mold to deposit a layer of pulp on the face of the receiving member, means to compress said layer of pulp between said members as the mold travels thereby to form an article of the desired shape, means operative automatically to apply suction to the receiving member and to supply compressed air to the compressing member during the compressing operation, means operative during the continued travel of the mold to supply compressed air to the receiving member and to supply suction to the compressing member, means to separate said mold members, the formed article being transferred from the receiving member to the compressing member by the combined action of the compressed air and suction, and means to vent the compressing mold member before suction is applied thereto.

4. In an apparatus of the type described, a pulp-containing vat, a travelling mold including a receiving member and a compressing member, means to give the mold its travelling movement and periodically to immerse the receiving member in the pulp to receive a layer of pulp thereon and then to raise said member from the pulp, means to press said mold members together after the receiving member has been raised from the pulp thereby to mold said pulp layer into an article of the desired shape, means to exhaust air from the receiving mold member during immersion and during the pressing operation, and means to supply compressed air to the compressing mold member during such pressing operation and while suction is on the receiving mold member.

5. In an appartus of the type described, a pulp-containing vat, a travelling mold including a receiving member and a compressing member, means to give the mold its travelling movement and periodically to immerse the receiving member in the pulp to receive a layer of pulp thereon and then to raise said member from the pulp, means to press said mold members together after the receiving member has been raised from the pulp thereby to mold said pulp layer into an article of the desired shape, means to exhaust air from the receiving mold member during immersion and during the pressing operation, means to supply compressed air to the compressing mold member during such pressing operation, means to deliver compressed air to the receiving member and apply suction to the compressing member after the pressing operation, and means to vent the compressing mold member between the time that the compressed air is delivered thereto and the suction is applied thereto.

6. In an apparatus of the class described, a travelling mold having complemental mold faces between which the artitcle is formed and also having chambers and openings through the mold faces communicating with the chambers, a pulp-containing vat, means to immerse periodically one mold face in the pulp and then to raise it from the pulp, means to apply suction to said face while so immersed whereby a layer of pulp is deposited thereon, means to compress the pulp layer between the mold faces during the travelling movement of the mold and after said face has been raised from the pulp, and means automatically to apply suction to one of the chambers of the mold and simultaneously to apply compressed air to another chamber of the mold during the compressing operation.

7. In an apparatus of the class described, a travelling mold having complemental mold faces between which the article is formed, one of which is a receiving mold face and the other of which is a compressing mold face, said mold having chambers and openings through the mold faces communicating with the chambers, a pulp-containing vat, means to immerse periodically the receiving mold face in the pulp in the vat, and then to raise it from the pulp, and to apply suction to said face while so immersed, whereby a layer of pulp is deposited thereto, means to compress the layer of pulp between the mold faces after said face has been raised from the pulp, means to apply suction to one of the chambers of the mold faces during the compressing operation and simultaneously to apply compressed air to another chamber, and means to transfer the article from the receiving to the compressing face subsequent to the compressing operation.

In testimony whereof, I have signed my name to this specification.

BERT R. WILLIAMSON.